United States Patent
Klinger et al.

(10) Patent No.: US 11,209,561 B2
(45) Date of Patent: Dec. 28, 2021

(54) GENERATION OF FAULT DISPLACEMENT VECTOR AND/OR FAULT DAMAGE ZONE IN SUBSURFACE FORMATION USING STRATIGRAPHIC FUNCTION

(71) Applicant: Schlumberger Technology Corporation, Sugar Land, TX (US)

(72) Inventors: Jimmy Klinger, Stavanger (NO); Martin Neumaier, Montpellier (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 503 days.

(21) Appl. No.: 15/773,477

(22) PCT Filed: Nov. 3, 2016

(86) PCT No.: PCT/EP2016/076545
§ 371 (c)(1),
(2) Date: May 3, 2018

(87) PCT Pub. No.: WO2017/076966
PCT Pub. Date: May 11, 2017

(65) Prior Publication Data
US 2018/0321404 A1   Nov. 8, 2018

(30) Foreign Application Priority Data

Nov. 5, 2015  (FR) ...................................... 1560625

(51) Int. Cl.
*G01V 1/34*      (2006.01)
*G01V 99/00*     (2009.01)
*G01V 1/30*      (2006.01)

(52) U.S. Cl.
CPC .............. *G01V 1/345* (2013.01); *G01V 1/30* (2013.01); *G01V 1/301* (2013.01); *G01V 99/005* (2013.01); *G01V 2210/642* (2013.01)

(58) Field of Classification Search
CPC .......... G01V 1/30; G01V 1/301; G01V 1/345; G01V 2210/642; G01V 99/005
See application file for complete search history.

(56) References Cited

U.S. PATENT DOCUMENTS

2003/0231548 A1* 12/2003 Gillard ..................... G01V 1/30
367/40
2015/0234070 A1* 8/2015 Xu ......................... G01V 1/301
702/16
2016/0070012 A1* 3/2016 Rutten ..................... G01V 1/28
702/16

OTHER PUBLICATIONS

Admasu, et al., "Automatic method for correlating horizons across faults in 3D seismic data," Proceedings of the 2004 IEEE Computer Society Conference on Computer Vision and Pattern Recognition, Jun. 27-Jul. 2, 2004, Washington, DC, USA, IEEE Proceedings of the 2004 IEEE Computer Society Conference on Computer Vision and Pattern Recognition IEE, vol. 1, Jun. 27, 2004, pp. 114-119.

(Continued)

*Primary Examiner* — Kyle R Quigley

(57) ABSTRACT

A method, apparatus, and program product may model a subsurface formation by computing an iso-surface for an iso-value from a three-dimensional stratigraphic function (436) for a volume of interest in the subsurface formation, computing first and second strike traces (454, 456) following a topography of the computed iso-surface on respective first and second sides of a fault (452) in the volume of interest, extracting seismic data (458, 460) along the first and second strike traces, correlating the extracted seismic data along the first and second strike traces, and computing a fault displacement vector (C) for the fault from the correlated extracted seismic data along the first and second strike traces.

19 Claims, 10 Drawing Sheets

(56) References Cited

OTHER PUBLICATIONS

Lomask, et al., "Volumetric Flattening: An Interpretation Tool," The Leading Edge, Society of Exploration Geophysicists, US, vol. 26, No. 7, Jul. 1, 2007.
Maerten, et al., "How to Constrain 3-D Fault Continuity and Linkage Using Relection Seismic Data: A Geomechanical Approach 1," Sep. 1, 2000, pp. 1311-1324.
Souche, et al., "IPTC-18216-MS Construction of Structurally and Stratigraphically Consistent Structural Models Using the Volume-Based Modelling Technology: Applications to an Australian Dataset," Dec. 10, 2014, pp. 1-12.
Office Action for the equivalent French patent application 1560625 dated Jan. 21, 2016.
Search Report for the equivalent French patent application 1560625 dated Aug. 16, 2016.
International Search Report and Written Opinion for the equivalent International patent application PCT/EP2016/076545 dated Feb. 3, 2017.
International Preliminary Report on Patentability for the equivalent International patent application PCT/EP2016/076545 dated May 17, 2018.

\* cited by examiner

GENERATION OF FAULT DISPLACEMENT VECTOR AND/OR FAULT DAMAGE ZONE IN SUBSURFACE FORMATION USING STRATIGRAPHIC FUNCTION

BACKGROUND

Reservoir modeling and simulation are commonly used in the oil & gas industry to model the structure and/or properties of a subsurface formation, e.g., of the type containing recoverable hydrocarbons. Reservoir modeling and simulation may be used during various phases of exploration and production, including, for example, to attempt to predict the location, quantity and/or value of recoverable hydrocarbons, to plan the development of wells for cost-effectively extracting hydrocarbons from the subsurface formation, and to guide future and/or ongoing production and development decisions.

Reservoir modeling and simulation may be challenging due to the fact that data gathering techniques such as seismic surveys and well logging may provide an incomplete picture of the structure and other properties of a subsurface formation, particularly when a subsurface formation is highly faulted and/or otherwise of a complex structure. As a result, despite the increasing sophistication of computer modeling techniques, manual interpretation of collected data by skilled personnel is still relied upon in many circumstances to generate structural information representing the structure of the faults and geological layers running through a subsurface formation.

Furthermore, despite improvements in the resolution of seismic and other data gathering techniques, some minor structural features within a subsurface formation still cannot be detected at these resolutions, leading to inaccuracies in structural models. Faults and other structural heterogeneities can significantly impact the migration and trapping of hydrocarbons in a subsurface formation, so increases in modeling accuracy can have a significant benefit for identifying recoverable hydrocarbons as well as predicting production and guiding decision-making for exploration and/or production.

Furthermore, it has been found that greater understanding of the structures within a subsurface formation can be realized through analysis of the temporal development of the subsurface formation. Structural restoration techniques, for example, may be used to verify the consistency of subsurface structural interpretations by attempting to reproduce natural deformation in a subsurface formation over time and effectively restore geological structures to their states at an earlier point in time. Based upon structural restoration, greater understanding of the evolution of a subsurface formation over time due to tectonic and other geological processes may be realized, which may further provide greater insight into the locations and migration pathways of recoverable hydrocarbons.

Structural restoration techniques, however, may be limited due to an inability to accurately determine appropriate constraints and parameters used in such techniques. For example, some structural restoration techniques rely on fault displacement vectors to characterize the displacement of rock across along faults. In addition, some structural restoration techniques rely on definitions of fault damage zones around faults, which are volumes of deformed rocks surrounding a fault that can provide insight on fault propagation, fault growth and/or fluid flow.

It has been found, for example, that in regions which have undergone significant strike-slip deformation, resulting in dominantly lateral displacement of rock along a fault plane or fault system, restoration constraints such as fault displacement vectors and fault damage zone definitions can be particularly challenging to determine. As such, a continuing need exists in the art for improved techniques for determining fault displacement vectors, fault damage zones and other structural characteristics of a subsurface formation for use in structural restoration and other modeling techniques.

SUMMARY

In some embodiments, a subsurface formation may be modeled by computing an iso-surface for an iso-value from a three-dimensional stratigraphic function for a volume of interest in the subsurface formation, computing first and second strike traces following a topography of the computed iso-surface on respective first and second sides of a fault in the volume of interest, extracting seismic data along the first and second strike traces, correlating the extracted seismic data along the first and second strike traces, and computing a fault displacement vector for the fault from the correlated extracted seismic data along the first and second strike traces.

In some embodiments, computing the fault displacement vector includes computing a strike-slip vector. In some embodiments, correlating the extracted seismic data includes performing a cross-correlation of the extracted seismic data along the first and second strike traces, and in some embodiments, computing the fault displacement vector includes determining a magnitude of the fault displacement vector based upon an offset between matching signatures in the extracted seismic data along the first and second strike traces.

In some embodiments, the iso-value is a first iso-value that only covers a portion of a vertical extent of the fault, and the method also includes computing a plurality of iso-surfaces for a plurality of iso-values from the three-dimensional stratigraphic function that substantially cover a remaining portion of the vertical extent of the fault, computing pluralities of first and second strike traces following topographies of the plurality of computed iso-surfaces, extracting seismic data along the pluralities of first and second strike traces, correlating the extracted seismic data along the pluralities of first and second strike traces, and computing fault displacement vectors for the fault from the correlated extracted seismic data along the pluralities of first and second strike traces.

In addition, some embodiments also include computing a fault damage zone for the fault, and some embodiments further include refining the computed fault displacement vector based upon the computed fault damage zone. In addition, in some embodiments, computing the first and second strike traces includes computing the first and second strike traces to follow the topography of the computed iso-surface at a first distance from the fault, computing the iso-surface, computing first and second strike traces, extracting the seismic data, correlating the extracted seismic data and computing the fault displacement vector collectively include performing a fault displacement vector calculation operation for the first distance, and computing the fault damage zone for the fault includes performing the fault displacement vector calculation operation at a plurality of distances to identify a distance proximate an edge of the fault damage zone. In some embodiments, performing the fault displacement vector calculation operation at the plurality of distances includes, at each of the plurality of distances, determining whether a cross-correlation of the extracted seismic data meets a cross-correlation threshold, and identifying the distance includes identifying the distance based upon determining that the cross-correlation of the extracted seismic data does not meet the cross-correlation threshold. Further, in some embodiments, the plurality of distances are ordered in a decreasing order, and identifying the distance includes identifying the distance as a smallest distance at which a determination is made that the cross-correlation of the extracted seismic data does meet the cross-correlation threshold.

Some embodiments also include causing a graphical depiction of the fault displacement vector or the fault damage zone to be displayed on a computer display, and some embodiments further include extrapolating a channel into the fault damage zone using the computed fault displacement vector. In addition, some embodiments further include performing a structural restoration, recreating a depospace geometry, or performing a reservoir simulation using the computed fault displacement vector.

Some embodiments include causing a graphical depiction of the extracted seismic data on the respective first and second side of the fault to be displayed on the computer display, while some embodiments include causing a graphical depiction of vector maps to be displayed on a computer display as attributes of a fault framework on one or both of a footwall view or a hangingwall view. In addition, in some embodiments, the first side is a footwall side and the second side is a hangingwall side, and in some embodiments, the stratigraphic function is a monotonously varying implicit function defined within the volume of interest. Further, in some embodiments, the fault is defined in a fault framework, and extracting the seismic data includes extracting the seismic data from a seismic volume.

Some embodiments may also include an apparatus including at least one processing unit and program code configured upon execution by the at least one processing unit to generate structural information for a subsurface formation in any of the manners discussed herein. Some embodiments may also include a program product including a computer readable medium and program code stored on the computer readable medium and configured upon execution by at least one processing unit to generate structural information for a subsurface formation in any of the manners discussed herein.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
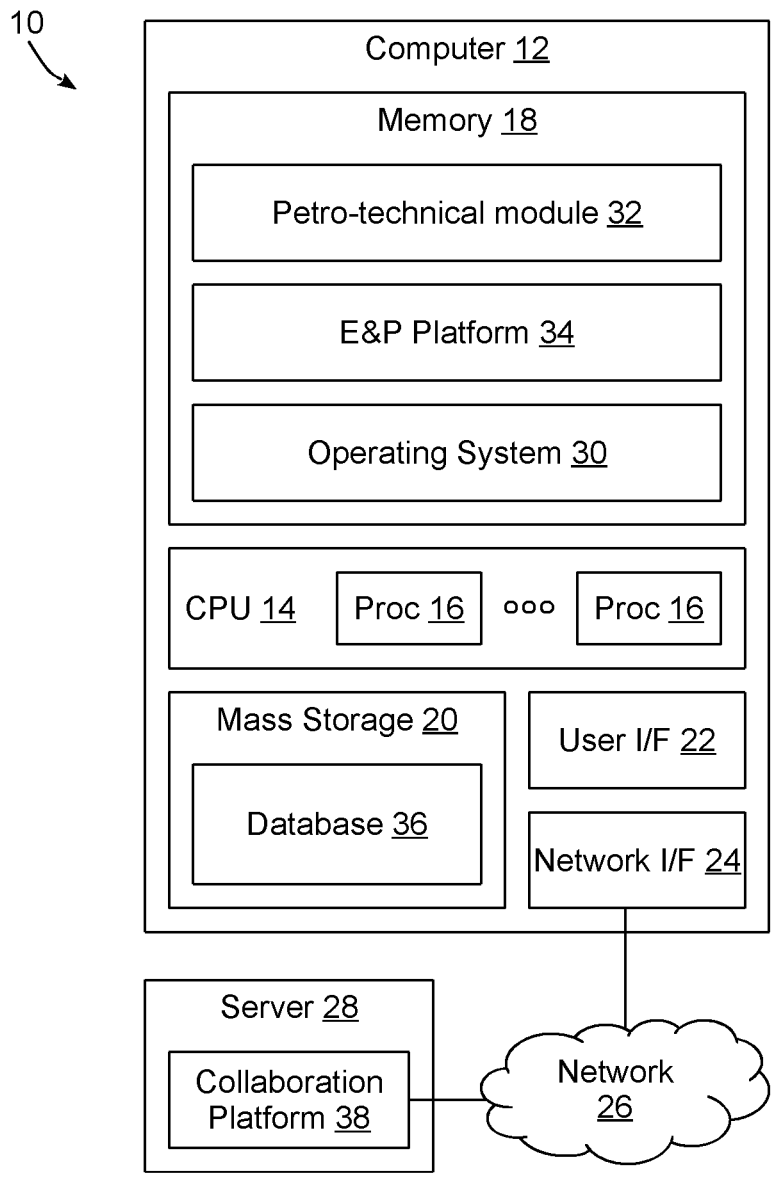
FIG. 1 is a block diagram of an example hardware and software environment for a data processing system in accordance with implementation of various technologies and techniques described herein.

The herein-described embodiments provide a method, apparatus, and program product that compute one or more fault displacement vectors and/or fault damage zones for one or more faults in a fault framework for a subsurface volume based at least in part on a stratigraphic function, also referred to herein as a stratigraphic implicit function.

In some embodiments, a stratigraphic implicit function may be used in a volume based modeling structural framework of a subsurface formation, and may be considered to be a monotonously varying function that is based on stratigraphic age in the subsurface formation, that may be discontinuous at faults and/or sequence boundaries, and from which a value representative of stratigraphic age (e.g., relative geological age or relative stratigraphic thickness to a reference) may be determined based upon a three dimensional location in the subsurface formation, e.g., represented by Cartesian or other coordinates (e.g., (x, y, d), where x and y are geographical coordinates and d is depth below a reference depth such as the surface or sea level).

For example a value representative of stratigraphic age may be a scalar attribute such as a Relative Geological Age (RGA) attribute in some embodiments of the invention. A stratigraphic implicit function may be monotonously varying to the extent that it increases or decreases monotonously at least from an oldest horizon to a youngest horizon in a volume of interest. As will be appreciated by one of ordinary skill in the art having the benefit of the instant disclosure, a single value of the stratigraphic implicit function may define a conformable horizon surface throughout a volume of interest, and that, due to faults and other geological discontinuities (for example angular unconformities resulting from erosional processes or non-deposition), such a surface may be discontinuous across such geological discontinuities. Moreover, in some embodiments (e.g., where there is no significant folding or faulting), within each conformable sequence a stratigraphic implicit function attribute may be proportional to the signed distance, or cumulative distance to, a reference surface, or to a ratio between a stratigraphic thickness separating two bounding surfaces and a stratigraphic thickness to one of the surfaces. Accordingly, in some embodiments, for a given value of the stratigraphic implicit function, a spatial distribution of that value may exist throughout at least a portion of a volume of interest in a subsurface formation.

A volume based modeling (VBM) structural framework generally refers to a structural framework incorporating a numerical model of a subsurface formation that principally models volumes (e.g., geological layers, fault blocks, geological bodies, etc.) as opposed to the surfaces bounding these volumes, and that is based at least in part on a stratigraphic implicit function as described above such that the distribution of the stratigraphic implicit function is known or can be interpolated everywhere within a volume of interest. In one example VBM structural framework, a structural framework may be constructed by building a tetrahedral mesh constrained by known faults in the subsurface formation, interpolating values of the implicit function on the nodes of the tetrahedral mesh (e.g., using a linear least squares formulation), and then generating surfaces representing implicitly modeled horizons based upon an iso-surfacing algorithm. The implicit function may in some embodiments be a stratigraphic implicit function.

As will be discussed in greater detail below, a stratigraphic function may be used to model a subsurface formation in some embodiments by computing an iso-surface for an iso-value from a three-dimensional stratigraphic function for a volume of interest in the subsurface formation, computing first and second strike traces following a topography of the computed iso-surface on respective first and second sides of a fault in the volume of interest, extracting seismic data along the first and second strike traces, correlating the extracted seismic data along the first and second strike traces, and computing a fault displacement vector for the fault from the correlated extracted seismic data along the first and second strike traces.

It will be appreciated that some embodiments may cause a graphical depiction of petro-technical data associated with a subsurface volume, e.g., computed fault displacement vectors, seismic traces, seismic attributes, fault damage zones, horizons, structural frameworks, fault frameworks, etc., to be displayed. In this regard, causing a graphical depiction to be displayed may include the actual generation of graphical data that is displayed locally on a computer display coupled to a computer, e.g., in the case of a stand-alone or single-user computer system. In other embodiments, e.g., in client-server, cloud-based or web-based embodiments, causing a graphical depiction to be displayed may include generating data and/or instructions that, when communicated to a different computer, cause that computer to generate the graphical data that is ultimately displayed on a computer display coupled to that different computer.

Other variations and modifications will be apparent to one of ordinary skill in the art.

Hardware and Software Environment

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12. It will be appreciated that in some embodiments, the functionality of one or more computers 12 and/or one or more servers 28 may be implemented within a cloud computing environment whereby petro-technical data may be stored and/or processed remotely from an end user.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the operations embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
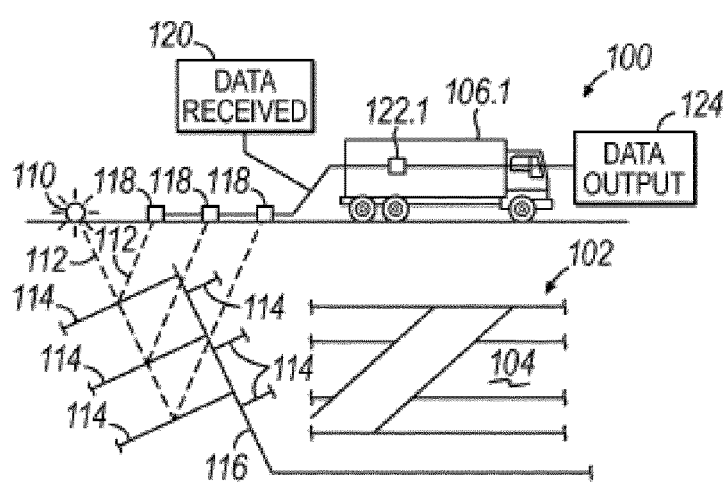
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
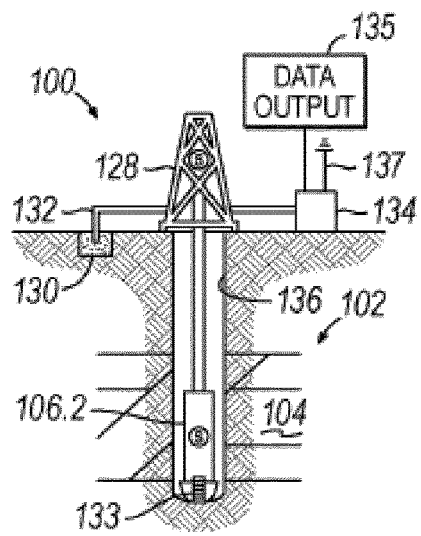

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
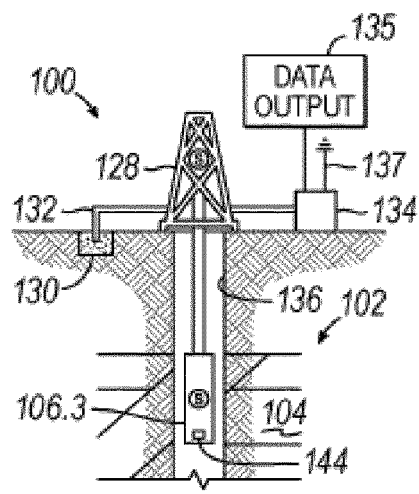

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
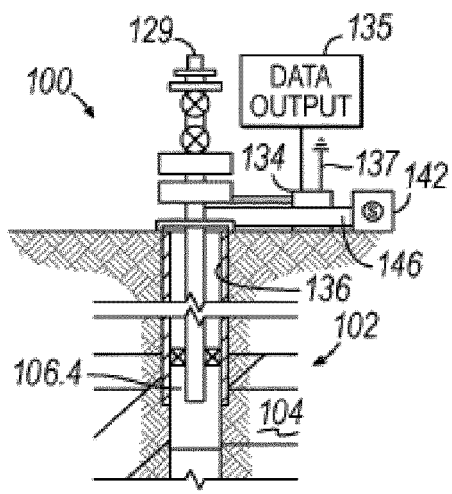

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
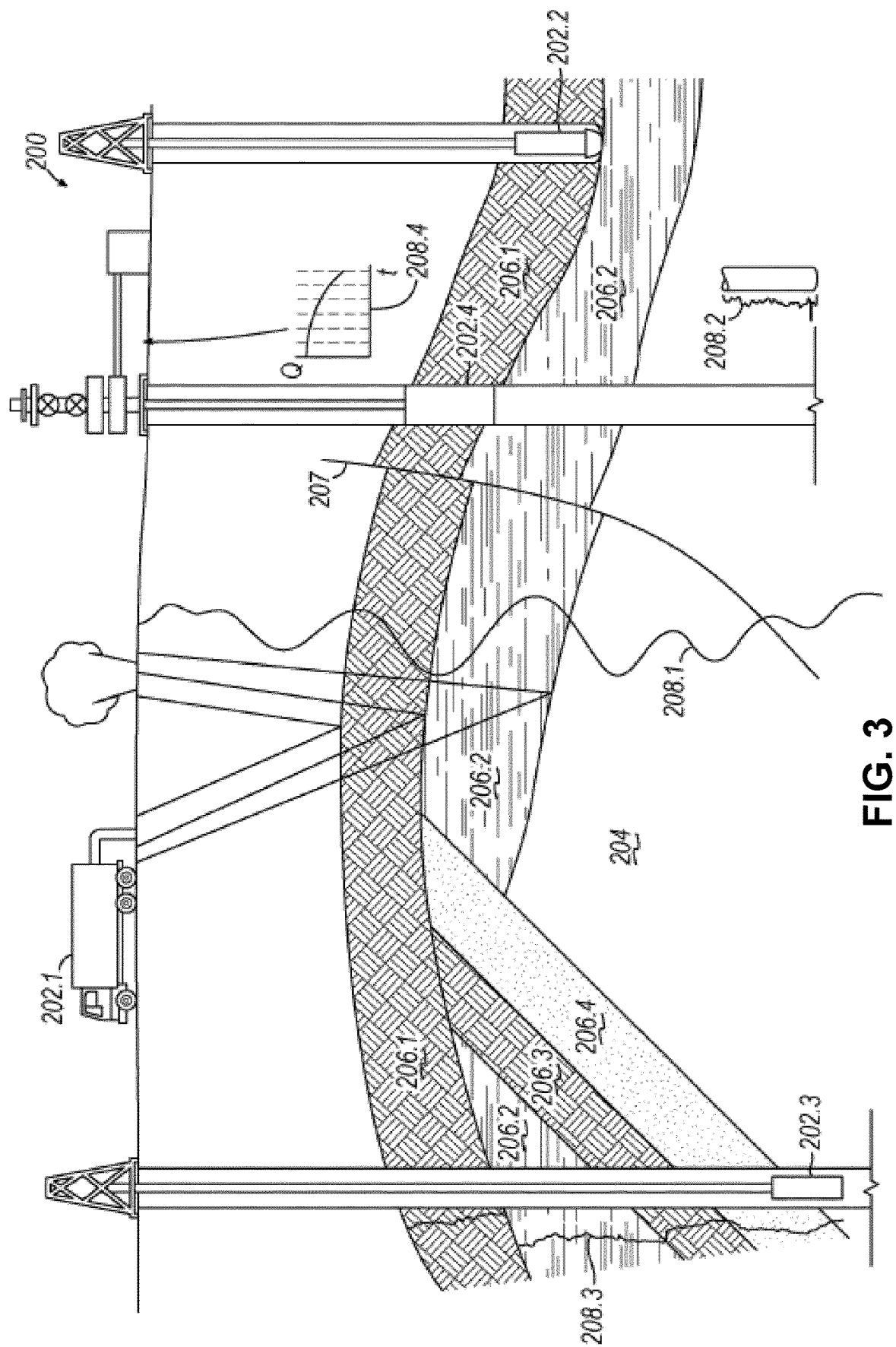
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
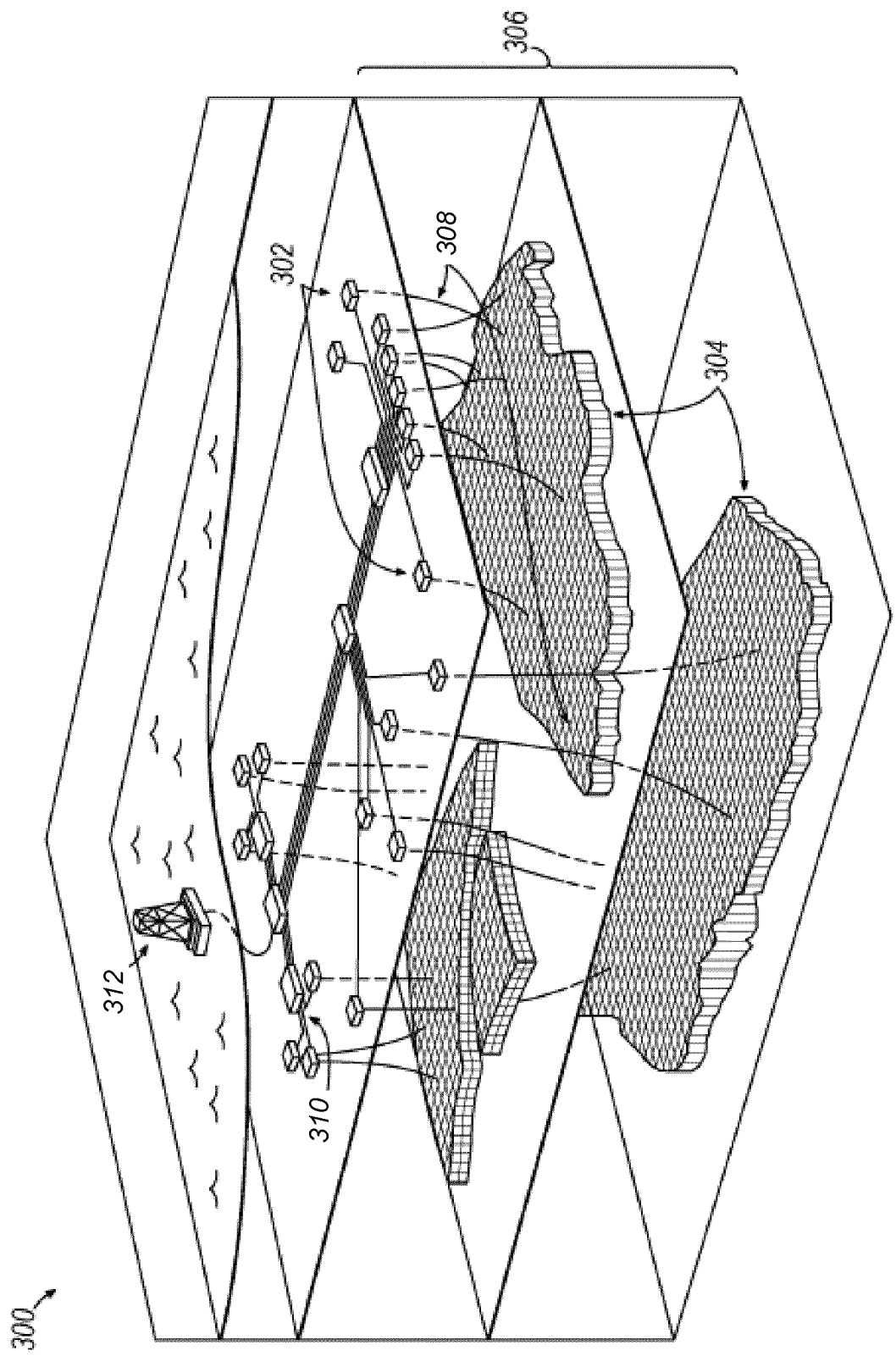
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 312. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 308 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 310. The surface networks 310 have tubing and control mechanisms for controlling the flow of fluids from the wellsite to processing facility 312.

Generation of Fault Displacement Vector and/or Fault Damage Zone in Subsurface Formation Using Stratigraphic Function Three Dimensional (3D) structural restoration technology is increasingly being used in the oil & gas industry, e.g., to verify structural interpretations. However, restoration constraints are often not well known and difficult to determine. It has been found, in particular, that restoration constraints are particularly difficult to determine in areas of a subsurface formation that have undergone significant strike-slip deformation, i.e., a dominantly lateral displacement of rock along a fault plane or fault system.

In some embodiments of the invention, on the other hand, a stratigraphic implicit function may be used to facilitate the detection of similarities (e.g., structural, geomorphological, etc.) on different sides of a fault to derive a three dimensional extent of a fault damage zone and/or to propose three dimensional fault displacement vectors, e.g., at least a strike-slip component, that may be used in further structural restoration, among other uses.

Figure 5:
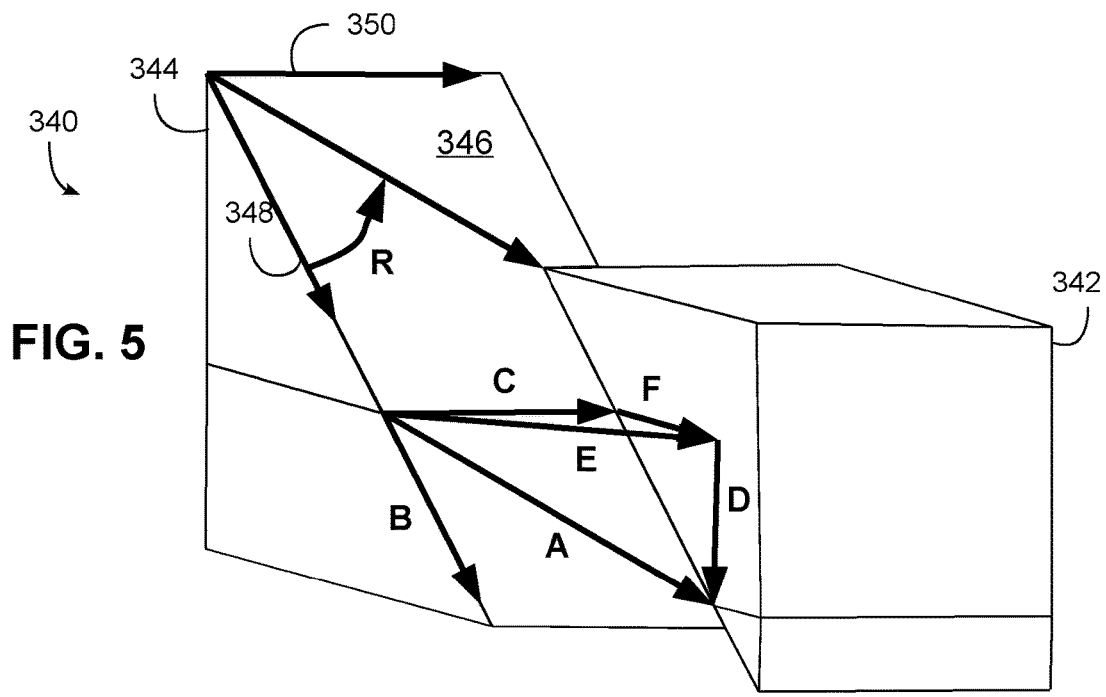
FIG. 5 is a perspective view of an example strike-slip fault and various fault displacement vectors characterizing the fault.

For the purposes of the discussion hereinafter, a fault displacement vector may be considered to be a vector that characterizes in some fashion the net-slip of a horizon along a fault in a subsurface volume. FIG. 5, for example, illustrates a portion of a subsurface volume 340 including blocks 342, 344 respectively disposed above and below a fault plane 346. An arrow 348 represents dip, and arrow 350 represents a rights-hand rule strike. Furthermore, for the purposes of this discussion, block 342 may be referred to as a hangingwall block due to its positioning above fault plane 346, while block 344 may be referred to as a footwall block. The net-slip along fault plane 346 is represented by arrow (A), which can be decomposed into several components (B)-(F), including a dip-slip component (B), strike-slip component (C), vertical throw component (D), horizontal throw component (E) and heave component (F). Moreover, the slip direction of the hangingwall block within fault plane 346 may also be characterized by a rake angle (R) taken from the dip-parallel slip component represented by arrow 348.

It has been found that in some situations, e.g., in extensive or compressive environment, the vertical throw (D) and dip-slip (B) components may be determined in a relatively straight-forward manner from interpretation. However, the horizontal throw (E) and strike-slip (C) components are generally more complex to estimate and embed into a structural model, e.g., as an indirect result of geometrical/ geomechanical palinspastic reconstruction of a structural model.

Embodiments consistent with the invention, on the other hand, may employ various computer-implemented workflows allowing for detection of similarities (e.g., structural, geomorphological, etc.) on different sides of a fault to derive, using a stratigraphic function, the three-dimensional extent of a fault damage zone and/or propose various three dimensional fault displacement vectors, e.g., a strike-slip component, which may then be used for various purposes such as structural restoration.

In some embodiments, for example, a workflow may be implemented to automatically compute various three dimensional fault displacement vectors (e.g., vectors (A)-(F) in FIG. 5), including the strike-slip (C) component of the net-slip (A) component, using a combination of inputs and cross-correlation methods. In addition, in some embodiments, these calculated vectors may additionally be used in the estimation of the damage zone around the fault, and in some embodiments, the estimated fault damage zone may be used to refine one or more fault displacement vectors, e.g., the strike-slip component, along the fault plane.

Some embodiments allow for a more direct measure of the strike component (and therefore of the three dimensional fault displacement vectors) of the displacement along one or more faults, and potentially showing complex connections such as partial truncations. Such results may also, in some embodiments, be directly applied to structurally restore (retro-deform) the deformation caused by the fault, in automated pseudo-restoration workflows to recreate depospace-geometries, or for other technical purposes as will be appreciated by one of skill in the art having the benefit of the instant disclosure.

As noted above, the determination of fault displacement vectors may be based in part on a stratigraphic function defined for a subsurface volume. A stratigraphic function may in some embodiments define stratigraphic information for a structural framework model built using a VBM (Volume Based Modeling) technology. Doing so effectively enables the knowledge of relative stratigraphic age substantially throughout a volume of interest in a subsurface formation to be used in the fault displacement vector determination process. VBM technology may be used to directly model volumes (e.g., geological layers) rather than surfaces (e.g., the horizons that are bounding geographical layers). The approach generally relies on the concept of "implicit modeling", in which surfaces, referred to herein as iso-surfaces, are represented as iso-values of a volume attribute generally referred to as the implicit function. The volume attribute may be defined throughout a volume of interest and may represent the stratigraphic age of the formation.

Figure 6:
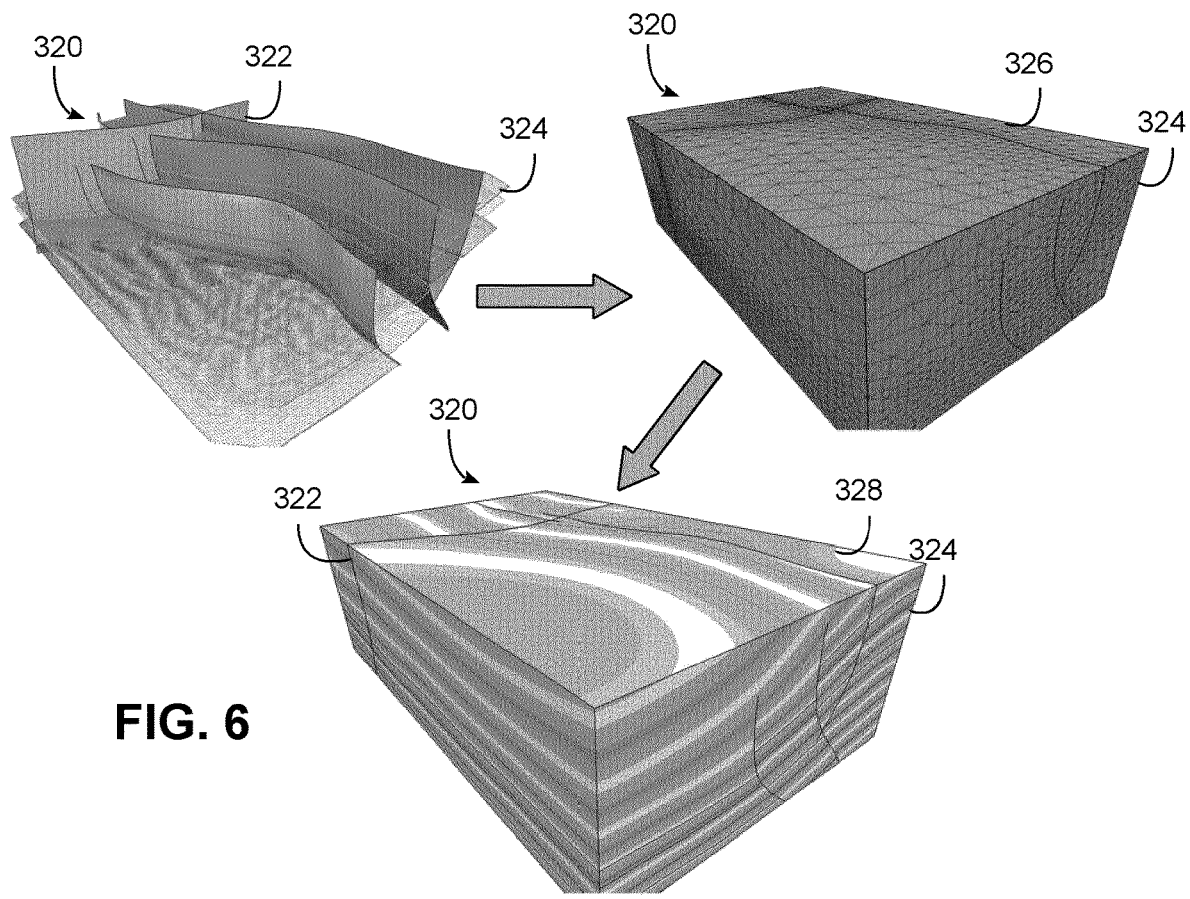
FIG. 6 illustrates components of an example volume based modeling structural framework, including input faults and horizon interpretations, a tetrahedral mesh, and relative stratigraphic age represented with a periodic color map.

As illustrated in FIG. 6, a structural framework 320 may be initially defined by faults 322 and horizons 324, determined, for example, via seismic surveys, or in other known manners, including in part using the techniques disclosed hereinafter. A tetrahedral mesh 326 is constructed, constrained by the existing faults 322 and horizons 324, for carrying the implicit function. Then, the values of the implicit function may be interpolated on the nodes of the tetrahedral mesh, as illustrated by the shading at 328. Using an iso-surfacing algorithm, an implicitly modeled surface may then be generated for each horizon, thereby resulting in a consistent zone model for the overall subsurface formation. The implicit function allows for building structural models based on a tetrahedral mesh constrained by input data (e.g., fault, well top and/or horizon interpretations). Such models may be used as the starting point for the construction of 3D reservoir grids.

Figure 7:
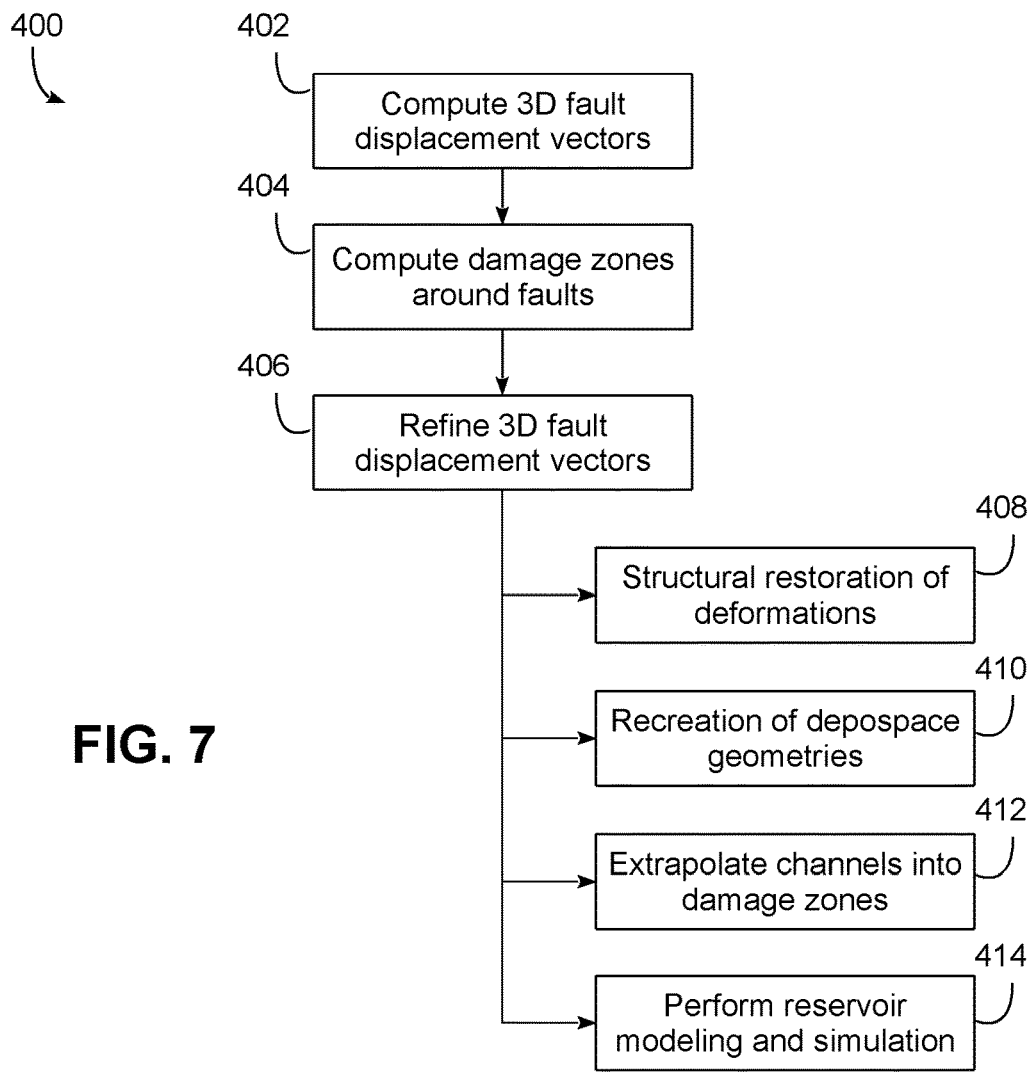
FIG. 7 is a flowchart illustrating an example sequence of operations for modeling a subsurface volume in accordance with implementation of various technologies and techniques described herein.

FIG. 7 illustrates at 400 an example sequence of operations for modeling a subsurface volume, and in particular, for utilizing stratigraphic information in the determination of fault displacement vectors and/or fault damage zones in a manner consistent with the invention. Sequence of operations 400 may be implemented in a computer, and may include operations that are automated and/or operations that are guided by a computer user, but nonetheless implemented in part using a computer to address a technical problem associated with determining fault displacement vectors and/or fault damage zones in a subsurface volume. In sequence of operations 400, for example, one or more three dimensional fault displacement vectors (e.g., any or all of the vectors of FIG. 5) may be determined in block 402. Then, in block 404 (which is optional in some embodiments), one or more fault damage zones may be determined, and in block 406 (which is also optional in some embodiments), one or more of the fault displacement vectors determined in block 402 may be refined, e.g., based upon the fault damage zones determined in block 404.

In addition, as illustrated by blocks 408-414, the fault displacement vectors and/or fault damage zones determined in blocks 402-406 may be used in further technical operations, e.g., in the performance of structural reconstruction of deformations (block 408), in the recreation of depospace geometries (block 410), in the extrapolation of channels in to fault damage zones (block 412) and/or the performance of reservoir modeling and/or simulation (block 414). Additional technical operations that may use the aforementioned computations include shale gauge ratio estimation, transmissibility multipliers, etc.

Figure 8:
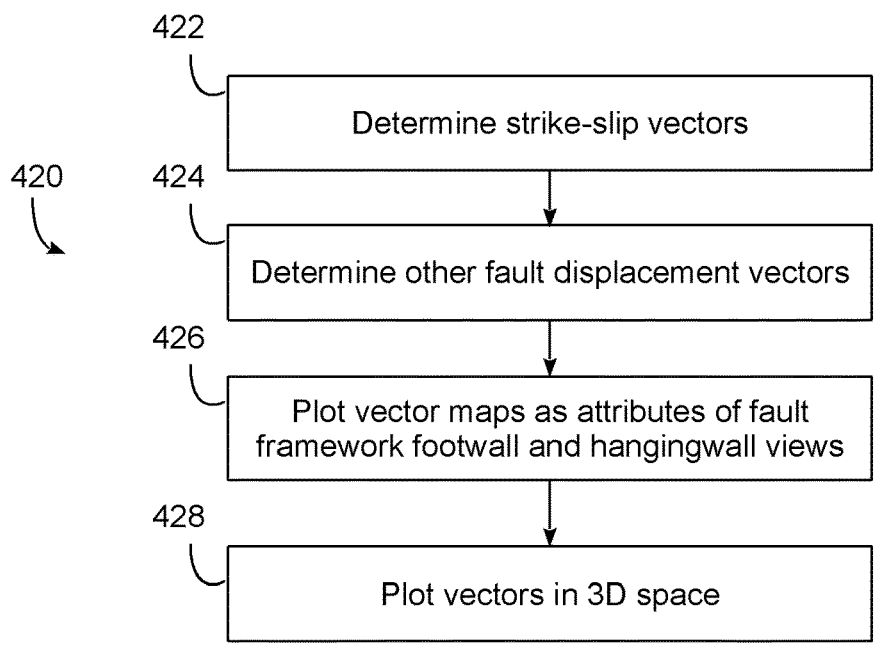
FIG. 8 is a flowchart illustrating an example sequence of operations for computing fault displacement vectors for one or more faults in a fault framework in accordance with implementation of various technologies and techniques described herein.

Turning next to FIG. 8, this figure illustrates an example sequence of operations 420 for computing fault displacement vectors for one or more faults in a fault framework, e.g., as one implementation of block 402 of FIG. 7. In sequence of operations 420, slip-strike vectors or components (e.g., component (C) of FIG. 5) may be computed for a plurality of faults in a fault framework defined for a subsurface volume in block 422, e.g., in the manner discussed below in connection with FIG. 9. Next, the remaining slip and throw fault displacement vectors may be determined in block 424, e.g., using the determined strike-slip vectors from block 422 and the vertical throw (D) and dip-slip (B) vectors determined from interpretation, or in other manners known in the art.

Next, in block 426, the resulting continuous slip and throw vector maps may then be plotted as attributes of the fault framework (e.g., in both the footwall view and hangingwall view). Further, as illustrated by block 428, the vectors may also optionally be plotted in 3D space in some embodiments. It will be appreciated that the combination of vertical throw with horizontal throw may create a vector field on the fault plane enabling a reconstruction of the path of a particle on the fault plane between its depositional location (i.e., in an un-faulted environment) and the present day geometry. It will also be appreciated that the displacement of such a particle may be oriented differently if the particle is located on the footwall block compared to the hangingwall block on the different sides of the fault plane.

Further constraints may be added to the process in some embodiments in order to ensure geological consistency and robustness, e.g., an assumption that displacement (dip or strike) is null at a fault tip-line. Other constraints may include, for example, using a fault distance attribute or watershed compartmentalization of the model in order to bound the estimation process to the vicinity of a given fault.

Figure 9:
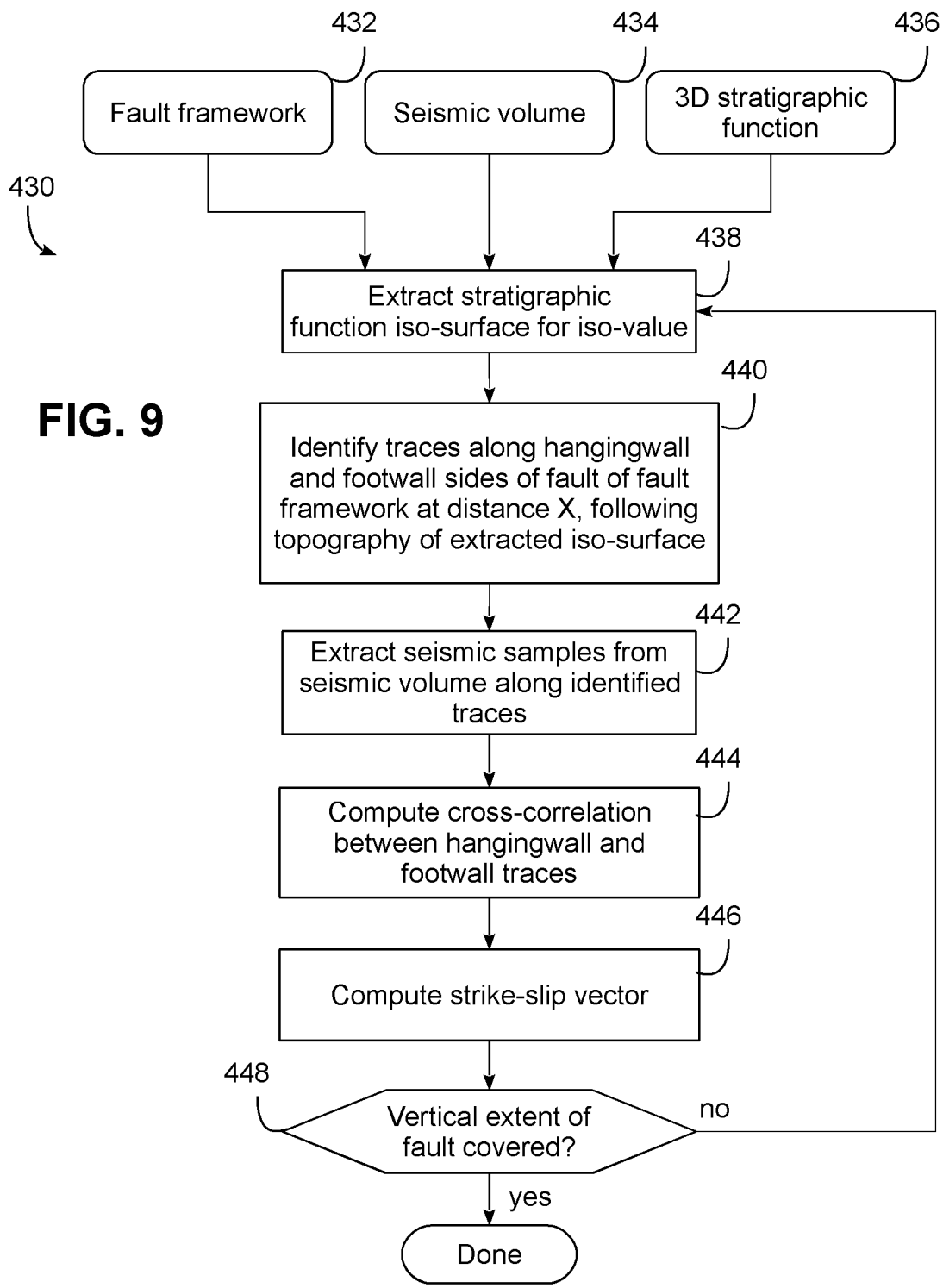
FIG. 9 is a flowchart illustrating an example sequence of operations for computing a strike-slip fault displacement vector for a fault in accordance with implementation of various technologies and techniques described herein.

Now turning to FIG. 9, this figure illustrates an example sequence of operations 430 for computing a strike-slip fault displacement vector for a single fault. This sequence may be repeated for multiple faults when e.g., when computing strike-slip fault displacement vectors for multiple faults in a fault framework in block 422 of FIG. 8. Sequence of operations 430 may receive input from a fault framework 432, a seismic volume 434 and a three dimensional stratigraphic function 436.

Fault framework 432 may define the structure, e.g., the location and orientation of one or more fault planes, defining a plurality of faults in a subsurface volume. The fault framework may be derived in some embodiments from fault interpretation, and in some embodiments, the determination of a strike-slip vector or component may be based directly upon fault points determined via interpretation, and as such, no fault framework may be used. Seismic volume 434 defines one or more attributes substantially within each point throughout the subsurface volume of interest. In some embodiments, raw seismic amplitude data, e.g., as collected via seismic surveys, may be used, while in other embodiments, seismic attributes derived from raw seismic amplitude data may be used, e.g., RMS amplitudes, acoustic or elastic impedance; seismo-facies volumes; PDF's of seismo-facies volumes, etc. Stratigraphic function 436 characterizes the relative geological age of substantially each point within the subsurface volume of interest.

Sequence 430 begins in block 438 by selecting an iso-value for the stratigraphic function to extract an iso-surface corresponding to the selected iso-value. Block 440 then identifies two fault-parallel traces, referred to herein as strike traces, on opposing footwall and hangingwall sides of the fault. The strike traces are selected to be separated from the fault plane of the fault by a distance X, and generally follow the topography of the extracted iso-surface.

Block 442 then extracts a seismic attribute (e.g., raw amplitude or an attribute derived therefrom) from the seismic volume along each of the strike traces, and a cross-correlation is performed between the footwall and hangingwall seismic amplitude/attribute strike traces in block 444. In such a way, similar geological objects (e.g., two parts of a displaced channel) can be detected on either side of the fault, connected by the strike-slip vector C. This vector may be proposed for each given location of the strike traces, and may be considered to approximate the edges of a fault damage zone.

Figure 10:
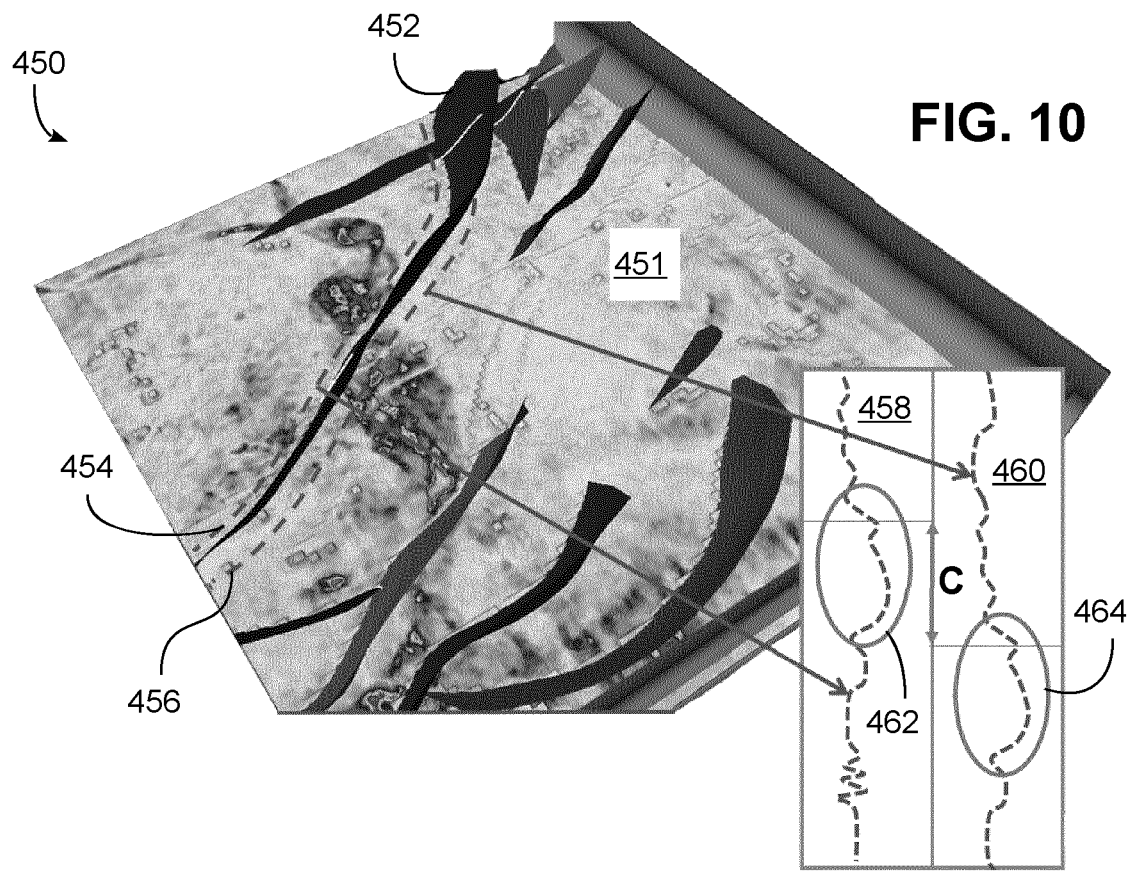
FIG. 10 is a graphical depiction of an example fault framework and extracted seismic attributes for a fault from the example fault framework, and illustrating operations performed in the flowchart of FIG. 9.

For example, as illustrated by graphical depiction 450 of FIG. 10 (representing a three-dimensional view of the subsurface volume including a fault framework as well as an RMS attribute rendered on a stratigraphic iso-value map 451), for a given fault (e.g., fault 452), strike traces 454, 456 may be defined parallel to and offset from the fault as discussed above in connection with blocks 438-440 of FIG. 9. Seismic attributes, e.g., RMS attributes 458 and 460 may be extracted for each strike trace 454, 456 (block 442 of FIG. 9), and cross-correlation may be performed in block 444 of FIG. 9 to identify, for example, matching signatures 462, 464 in seismic attributes 458, 460, representing the horizontal morphology of a channel body parallel to the fault. The offset from these signatures represents the magnitude of the strike-slip vector C, as shown by the double-headed arrow in FIG. 10.

Returning to FIG. 9, in some embodiments a single iso-value may only cover a portion of a vertical extent of a fault, and as such, multiple strike traces derived from multiple iso-values may be computed in order to provide a vertically continuous representation of the slip-vector along substantially an entire vertical extent of the fault, and as such, block 448 may determine whether the full vertical extent of the fault has been covered, and if not, return control to block 438 to select a different iso-value and extract a different iso-surface from the stratigraphic function therefrom, and to repeat blocks 440-446 to compute the slip-vector at one or more additional locations along the fault. Once the full vertical extent has been covered, sequence of operations 430 is complete.

In the illustrated embodiment, sequence of operations 430 may be considered to collectively represent a fault displacement vector calculation operation performed at a distance X. In addition, the distance X used in sequence of operations 430 when computing a strike-slip vector may be selected at a given distance "V" to the fault plane, which represents an envelope that is wide enough to contain a fault damage zone and to enable the detection of geological objects for cross-correlation and the computation of the displacement vectors.

In addition, in some embodiments, this distance X may be among a plurality of distances at which the fault displacement vector calculation operation is performed in order to determine or compute a fault damage zone for the fault. In some embodiments, the fault displacement vector calculation operation is performed at different distances to identify a distance proximate an edge of the fault damage zone. At each of the plurality of distances, a determination may be made as to whether a cross-correlation of extracted seismic data meets a cross-correlation threshold, such that a distance proximate the edge of the fault damage zone may be based upon a determination that the cross-correlation of the extracted seismic data does not meet the cross-correlation threshold.

In some embodiments, for example, the plurality of distances may be in decreasing order, e.g., based upon subtracting an increment distance at each of a plurality of steps, and then a fault damage zone may be identified by identifying a last or smallest distance at which a cross-correlation does meet a cross-correlation threshold.

Figure 11:
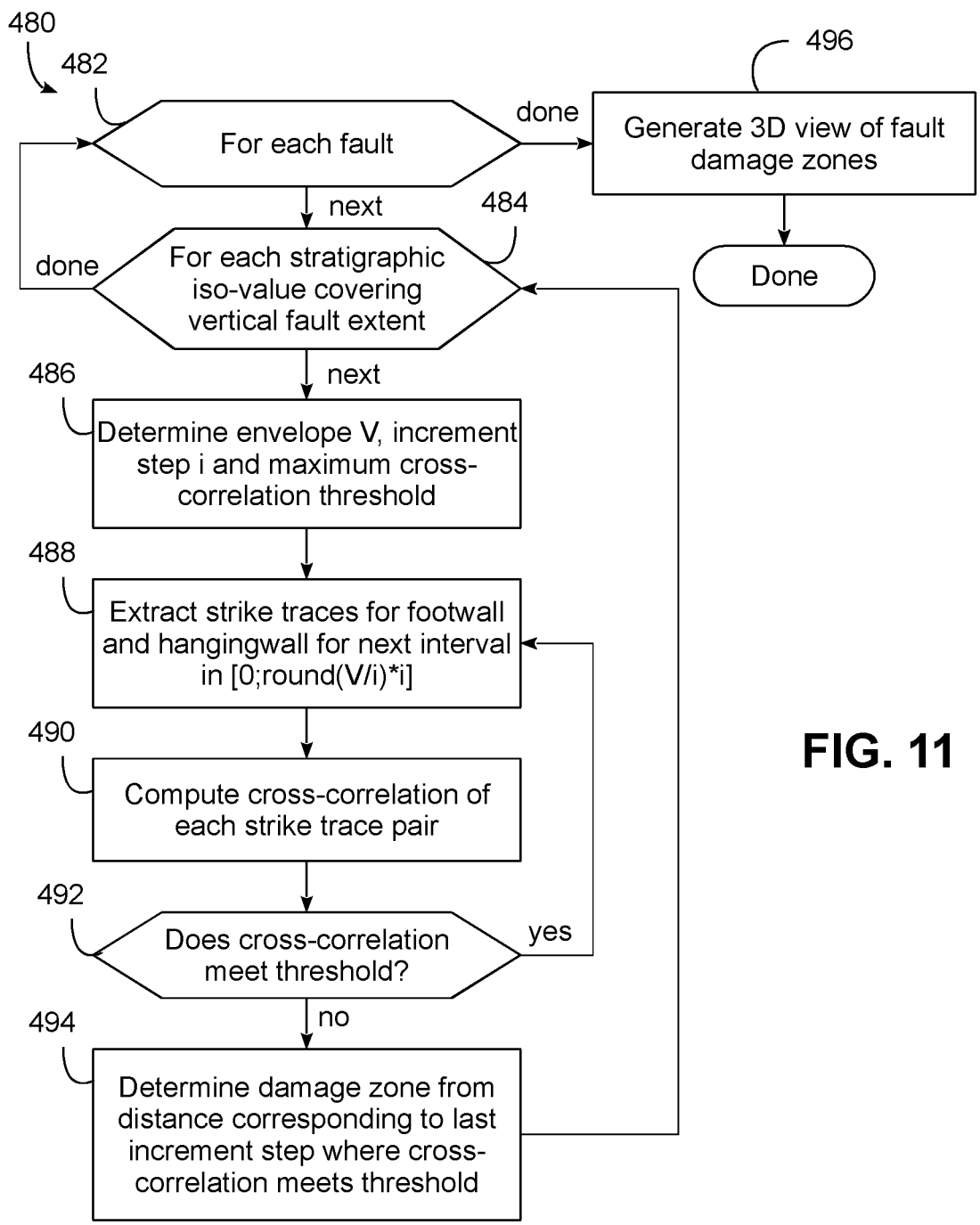
FIG. 11 is a flowchart illustrating an example sequence of operations for determining one or more fault damage zones in accordance with implementation of various technologies and techniques described herein.

Therefore, in some embodiments, the distance X used in sequence of operations 430 may be progressively decreased for multiple iterations of sequence of operations 430 to effectively estimate the damage zone around a theoretical fault plane, e.g., as discussed above in connection with block 404 of FIG. 7. FIG. 11, for example, illustrates an example sequence of operations 480 for determining one or more fault damage zones. For each fault in the fault framework, and for each stratigraphic iso-value covering the full vertical extent of that fault, nested FOR loops are initiated in blocks 482 and 484.

For each such fault and iso-value, block 486 determines an envelope (constant distance away from the fault) "V," an increment step i, and a cross-correlation threshold representing the maximum cross-correlation threshold above which cross-correlations of sedimentary bodies on a strike trace are considered to be valid (i.e., above the "noise level"). In other embodiments, the values of V, i, and the threshold may be determined once and may be applied to all of the faults in a fault framework.

Figure 12:
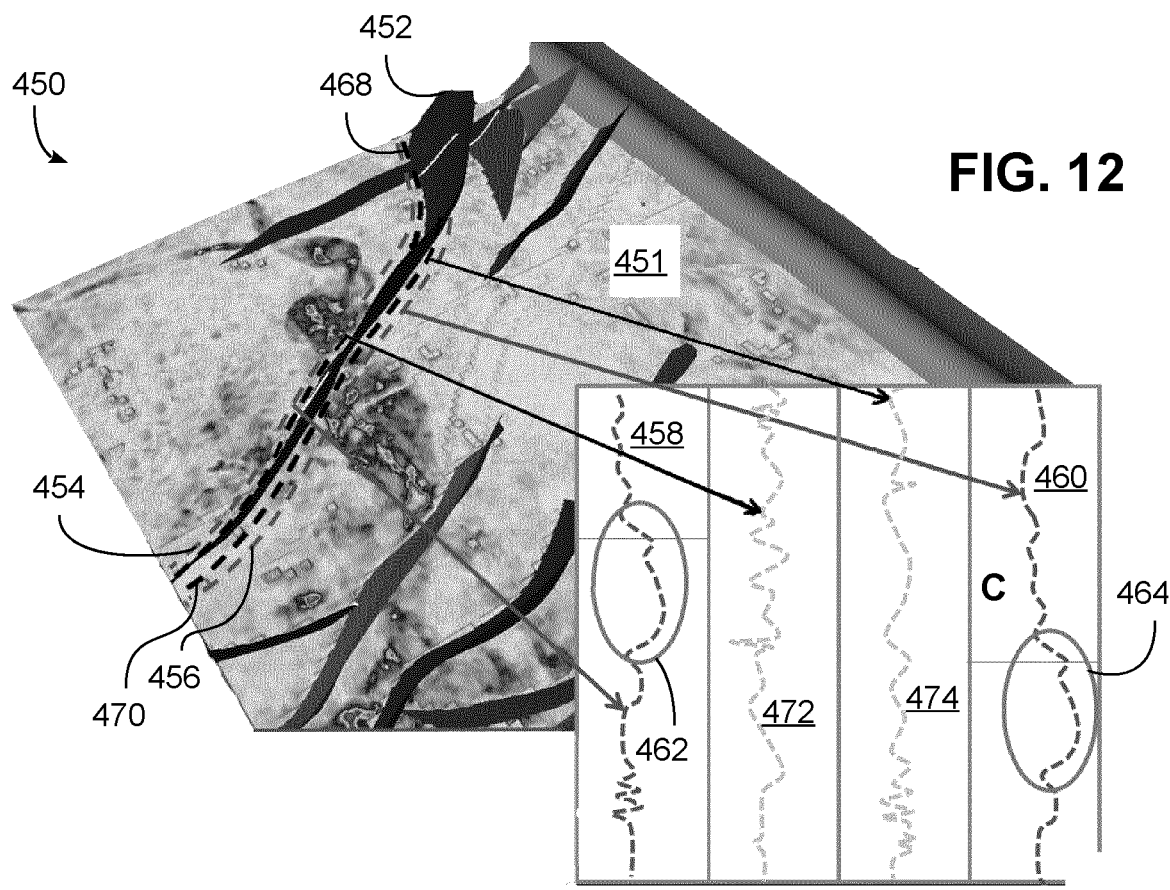
FIG. 12 is another graphical depiction of the example fault framework of FIG. 10, and illustrating operations performed in the flowchart of FIG. 11.

Next, in blocks 488 and 490, another loop is initiated to repeat the sequence of operations 430 described above in connection with FIG. 9, for multiples of the interval i, e.g., in the set $[0; \text{round}(V/i)*i]$, extracting strike traces at the progressively smaller fault-parallel distances from the fault plane (block 488) and computing the cross-correlation between the strike traces (block 490). So long as the computed cross-correlation meets the selected threshold, block 492 returns control to block 488 to perform an additional iteration at a smaller distance, and when the computed cross-correlation is "lost" and no longer meets the selected threshold, block 492 passes control to block 494 to determine the damage zone from the distance corresponding to the last increment step where the cross-correlation was found to meet the cross-correlation threshold. For example, FIG. 12 illustrates graphical depiction 450 of FIG. 10, with additional strike traces 468, 470 defined at a smaller fault-parallel distance from fault 452. Associated extracted seismic attributes are illustrated at 472 and 474, with no cross-correlation identified between the attributes. As such, the region through which strike traces 468, 470 pass may be considered to be within a fault damage zone, so the prior iteration, taken at a larger relative distance from the fault, may be considered to represent the fault damage zone around the fault.

Returning to FIG. 11, once the fault damage zone has been determined in block 494, control then returns to block 484 to process any additional iso-values for the fault. Once all iso-values for each fault have been processed block 482 passes control to block 496 to optionally generate a three dimensional view of the determined fault damage zones. This view may be used, for example, in subsequent reservoir modeling. It may also be used in some embodiments to optimize or the calculation of the displacement vectors, the operations discussed above in connection with sequence 420 of FIG. 8 may now be repeated as close as possible to the determined fault damage zone. Linear geological objects such as channels may be extrapolated into the fault damage zone to compute displacement vectors along the theoretical fault plane. Sequence of operations 480 is then complete.

Figure 13:
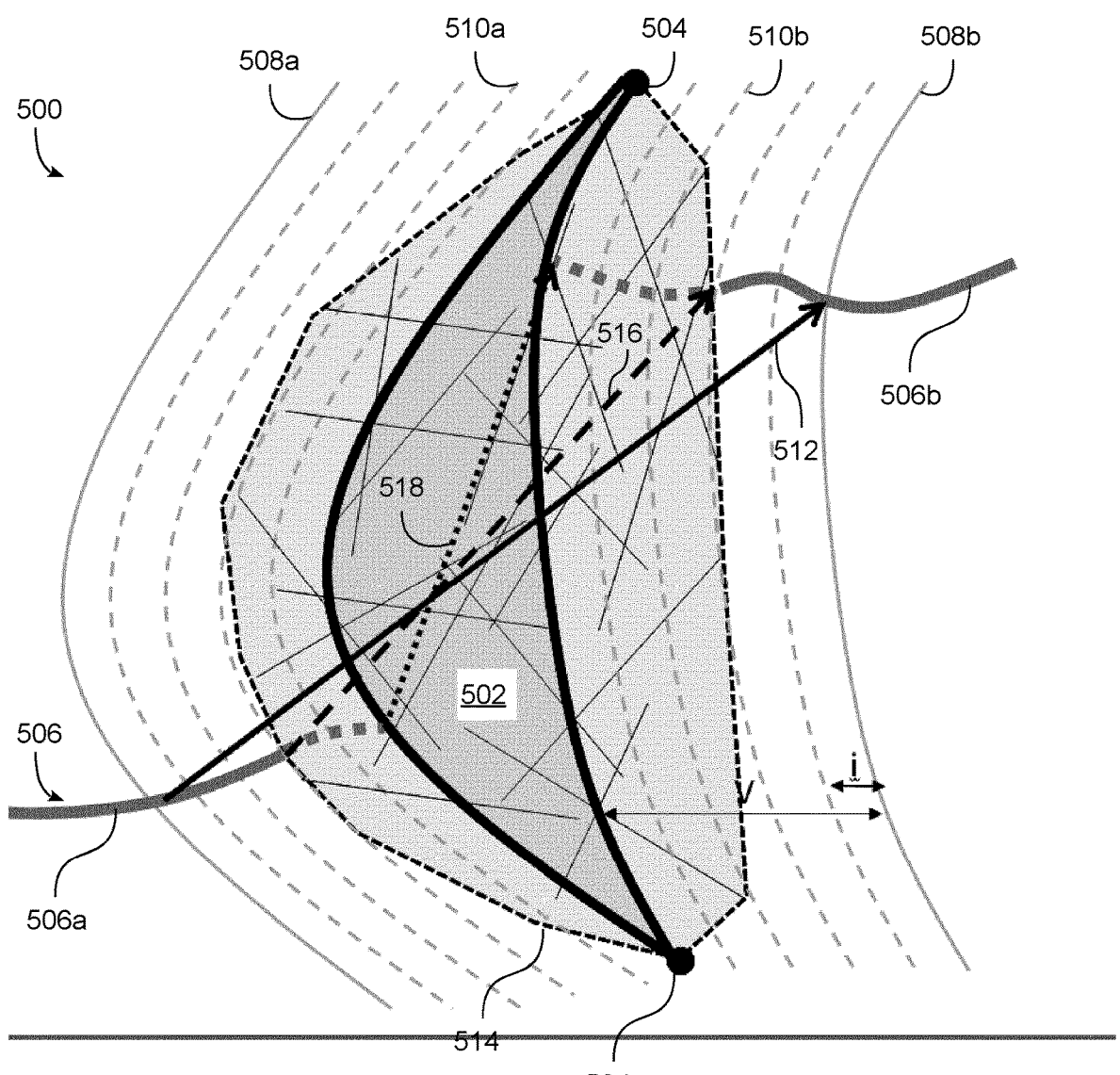
FIG. 13 is another graphical depiction illustrating operations performed in the flowchart of FIG. 11.

FIG. 13, for example, illustrates an example graphical depiction 500 of a fault 502 extending between fault tips 504. An identified geological object, such as a channel 506, is illustrated with separate portions 506*a*, 506*b* on opposing sides of the fault 502. Performing the sequence of operations 430 of FIG. 9 at a distance V from the fault 502 may result in an identification of a pair of strike traces 508*a*, 508*b*, as well as an initial estimate of the strike-slip vector as illustrated at 512. By iterating over a plurality of iterations with an increment step i using the sequence of operations 480 of FIG. 11, a series of progressively closer strike traces 510*a*, 510*b* may be identified, with the point at which a cross-correlation threshold is not met being illustrated by the dashed lines in FIG. 13 for portions 506*a*, 506*b*. At this point, a fault damage zone 514 may be defined, and moreover, the strike-slip vector may be refined as illustrated by vector 516. Assuming, for example, that the theoretical strike-slip vector is as illustrated at 518, it may be seen that the refined vector 516 is more accurate than the initial vector 512 in FIG. 13.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims.

It will also be appreciated that while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

The invention claimed is:

1. A method of modeling a subsurface formation, comprising:
    computing an iso-surface for an iso-value from a three-dimensional stratigraphic function for a volume of interest in the subsurface formation;
    computing first and second strike traces following a topography of the computed iso-surface on respective first and second sides of a fault in the volume of interest, wherein the first and the second strike traces are substantially parallel to and offset from the fault;
    extracting seismic data along the first and second strike traces;
    correlating the extracted seismic data along the first and second strike traces;
    identifying, using the correlated extracted seismic data, a minimal distance at which the correlated extracted seismic data does not meet a correlation threshold from a plurality of incremental distances;
    computing, using the minimal distance, a damage zone from a distance corresponding to a prior incremental distance where the correlated extracted seismic data does meet the correlation threshold; and
    computing, using the minimal distance and the damage zone, a fault displacement vector for the fault from the correlated extracted seismic data along the first and second strike traces.

2. The method of claim 1, wherein computing the fault displacement vector comprises computing a strike-slip vector.

3. The method of claim 1, wherein correlating the extracted seismic data comprises performing a cross-correlation of the extracted seismic data along the first and second strike traces.

4. The method of claim 3, wherein computing the fault displacement vector includes determining a magnitude of the fault displacement vector based upon an offset between matching signatures in the extracted seismic data along the first and second strike traces.

5. The method of claim 1, wherein the iso-value is a first iso-value that only covers a portion of a vertical extent of the fault, the method further comprising:
    computing a plurality of iso-surfaces for a plurality of iso-values from the three-dimensional stratigraphic function that substantially cover a remaining portion of the vertical extent of the fault; computing pluralities of first and second strike traces following topographies of the plurality of computed iso-surfaces; extracting seismic data along the pluralities of first and second strike traces; correlating the extracted seismic data along the pluralities of first and second strike traces; and computing fault displacement vectors for the fault from the correlated extracted seismic data along the pluralities of first and second strike traces.

6. The method of claim 1, further comprising refining the computed fault displacement vector based upon the computed fault damage zone.

7. The method of claim 1, wherein computing the first and second strike traces comprises computing the first and second strike traces to follow the topography of the computed iso-surface at a first distance from the fault, wherein computing the iso-surface, computing first and second strike traces, extracting the seismic data, correlating the extracted seismic data and computing the fault displacement vector collectively comprise performing a fault displacement vector calculation operation for the first distance, and wherein computing the fault damage zone for the fault comprises performing the fault displacement vector calculation operation at the plurality of incremental distances to identify a distance proximate an edge of the fault damage zone.

8. The method of claim 7, wherein performing the fault displacement vector calculation operation at the plurality of incremental distances comprises, at each of the plurality of incremental distances, determining whether a cross-correlation of the extracted seismic data meets a cross-correlation threshold, and wherein identifying the minimal distance includes identifying the minimal distance based upon determining that the cross-correlation of the extracted seismic data does not meet the cross-correlation threshold.

9. The method of claim 8, wherein the plurality of incremental distances are ordered in a decreasing order, and wherein identifying the prior incremental distance includes identifying the prior incremental distance as a smallest distance at which a determination is made that the cross-correlation of the extracted seismic data does meet the cross-correlation threshold.

10. The method of claim 1, further comprising causing a graphical depiction of the fault displacement vector or the fault damage zone to be displayed on a computer display.

11. The method of claim 1, further comprising extrapolating a channel into the fault damage zone using the computed fault displacement vector.

12. The method of claim 1, further comprising performing a structural restoration, recreating a depospace geometry, or performing a reservoir simulation using the computed fault displacement vector.

13. The method of claim 1, further comprising causing a graphical depiction of the extracted seismic data on the respective first and second side of the fault to be displayed on the computer display.

14. The method of claim 1, further comprising causing a graphical depiction of vector maps to be displayed on a computer display as attributes of a fault framework on one or both of a footwall view or a hangingwall view.

15. The method of claim 1, wherein the first side is a footwall side and the second side is a hangingwall side.

16. The method of claim 1, wherein the stratigraphic function is a monotonously varying implicit function defined within the volume of interest.

17. The method of claim 1, wherein the fault is defined in a fault framework, and wherein extracting the seismic data comprises extracting the seismic data from a seismic volume.

18. An apparatus, comprising:
at least one processing unit; and
program code configured upon execution by the at least one processing unit to model a subsurface formation by:
computing an iso-surface for an iso-value from a three-dimensional stratigraphic function for a volume of interest in the subsurface formation;
computing first and second strike traces following a topography of the computed iso-surface on respective first and second sides of a fault in the volume of interest, wherein the first and the second strike traces are substantially parallel to and offset from the fault;
extracting seismic data along the first and second strike traces;
correlating the extracted seismic data along the first and second strike traces;
identifying, using the correlated extracted seismic data, a minimal distance at which the correlated extracted seismic data does not meet a correlation threshold from a plurality of incremental distances;
computing, using the minimal distance, a damage zone from a distance corresponding to a prior incremental distance where the correlated extracted seismic data does meet the correlation threshold; and
computing, using the minimal distance and the damage zone, a fault displacement vector for the fault from the correlated extracted seismic data along the first and second strike traces.

19. A program product, comprising:
a non-transitory computer readable medium; and
program code stored on the non-transitory computer readable medium and configured upon execution by at least one processing unit to model a subsurface formation by:
computing an iso-surface for an iso-value from a three-dimensional stratigraphic function for a volume of interest in the subsurface formation;
computing first and second strike traces following a topography of the computed iso-surface on respective first and second sides of a fault in the volume of interest, wherein the first and the second strike traces are substantially parallel to and offset from the fault;
extracting seismic data along the first and second strike traces;
correlating the extracted seismic data along the first and second strike traces;
identifying, using the correlated extracted seismic data, a minimal distance at which the correlated extracted seismic data does not meet a correlation threshold from a plurality of incremental distances;
computing, using the minimal distance, a damage zone from a distance corresponding to a prior incremental distance where the correlated extracted seismic data does meet the correlation threshold; and
computing, using the minimal distance and the damage zone, a fault displacement vector for the fault from the correlated extracted seismic data along the first and second strike traces.

* * * * *